United States Patent Office 3,399,139
Patented Aug. 27, 1968

3,399,139
SYNTHETIC LUBRICANT COMPOSITION OF IMPROVED OXIDATION STABILITY
Alan D. Forbes, Knaphill, Woking, and Patrick Gould, Woodham, near Weybridge, England, assignors to The British Petroleum Company Limited, London, England, a corporation of England
No Drawing. Filed Jan. 17, 1966, Ser. No. 520,844
Claims priority, application Great Britain, Jan. 15, 1965, 1,866/65
6 Claims. (Cl. 252—37)

This invention relates to synthetic lubricants suitable for use at very high temperatures such as occur in modern aero gas turbines.

Lubricants used in modern jet aircraft, particularly supersonic aircraft, have to operate at high bulk oil temperatures (in the region of 200° C. or more) which have the effect of greatly accelerating the oxidative deterioration of the lubricant.

We have recently found that certain novel classes of aromatic esters generally have much better oxidation stability than the lubricants at present used in jet aircraft. These novel esters from the subject of copending United States application Ser. No. 382,964, filed July 15, 1964 and U.K. Patent Application 19,687/63; copending United States applications Ser. No. 400,243, filed Sept. 29, 1964, and Ser. No. 434,094, filed Feb. 19, 1965. In an attempt to improve still further the oxidation stability of these esters we have investigated the effect on them of certain conventional antioxidants for lubricants, for example, phenyl alpha naphthylamine, but unfortunately these antioxidants were found to be ineffective at high temperatures (230° C. or more).

It is well-established that organo-metallic compounds can catalyse the degradation of lubricant base-fluids. However, there are also a few references in the literature which suggest that metal organic acid salts or complexes can act as antioxidants. There appears to have been little investigation to determine the optimum concentrations at which the salts or complexes should be used.

It is known that the majority of the metallic elements react to form complexes which contain a considerable range of ligands, ranging from halogen ligands to, for example, ammonia ligands. The oxidation states of the metallic elements involved can range from zero to high positive values.

A considerable number of base fluids for lubricants which have to withstand the severe conditions mentioned above have been proposed. Examples of such lubricants are the siloxanes, the polyphenyl ethers and the aliphatic esters. Although some research has been carried out and published relating to the degradative oxidation of mineral base oils, little work has been published on the degradative oxidation of ester base fluids or successful methods for their protection proposed at high temperatures, for example, above 230° C.

A recent British patent specification, No. 942,161, suggests that aliphatic ester base-fluids in general may be protected from oxidative degradation by compositions containing metal complexes. The compositions proposed comprise a pyridylamine and/or a triazine in combination with a complex of such an organic nitrogen compound with a copper salt of a fatty acid, the mole ratio of total organic nitrogen compound to copper metal being between 2 and 75. It appears from this specification that only compositions which contain a pyridylamine or a triazine, preferably in excess, are effective. The lubricant composition preferably comprises 0.05–10%, more preferably 0.1–4%, by weight, based on the total composition, of each of the additives.

We have now found, surprisingly, that novel lubricating compositions of improved oxidation stability at temperatures of 200° C. or more can be produced by adding certain organo-metallic compounds to aromatic esters of the general types referred to above.

According to the invention, there is provided a lubricating composition based on a liquid organic ester base oil of the general formula:

$$XOOCRCCOY \qquad (I)$$

wherein R is a saturated hydrocarbon group having from 1 to 14 carbon atoms and X and Y are hydrocarbon or oxygen-containing hydrocarbon groups having from 6 to 20 carbon atoms, each of which either is a benzene ring or contains a benzene ring directly attached to the —COO— group, the base oil having dissolved therein one or more organo-metallic compounds as hereinafter defined in an amount which gives a metal content of up to 500 parts per million (p.p.m.), preferably from 1 to 15 p.p.m., based on the total weight of the composition.

It is to be understand that the base oil may comprise a mixture of different esters of Formula I.

The expression "oxygen-containing hydrocarbon group" is used herein in the restricted sense of meaning a group containing one or more ether oxygen atoms attached directly to benzene rings only. Examples of such groups include $C_6H_5OC_6H_4$—, $C_6H_5OC_6H_4OC_6H_4$— and $$CH_3C_6H_4OC_6H_4—$$

Examples of classes of aromatic esters of Formula I are given in copending United States applications Ser. No. 382,964, filed July 15, 1964, Ser. No. 400,243, filed Sept. 29, 1964, Ser. No. 434,094, filed Feb. 19, 1965, and U.K. Patent Application 19,687/63.

Particularly suitable classes of esters for use in the compositions according to the invention are those of the following two general formulae:

$$(CH_3)_3C \cdot C_6H_4OOCR_1COOC_6H_4C(CH_3)_3 \qquad (II)$$

wherein $R_1$ is a polymethylene chain having from 2 to 14 carbon atoms (with $(CH_3)_3C$, preferably in the ortho position) and $$R_2C_6H_4[OC_6H_3(R_2)]_n$$
$$OOCR_3COOC_6H_3(R_2)OC_6H_4R_2 \qquad (III)$$

wherein the $R_2$'s (which may be the same or different) are hydrogen atoms or alkyl groups having from 1 to 4 carbon atoms, $R_3$ is a saturated divalent aliphatic hydrocarbon group, for example, a polymethylene group having from 2 to 14, preferably from 7 to 14 carbon atoms, and $n$ is 0 or 1. Preferred esters of Formula III are those of the formula $C_6H_5OC_6H_4OOCR_3CCOC_6H_4OC_6H_5$ and those of the formula $R_2'C_6H_4OOCR_3COOC_6H_4OC_6H_5$ wherein $R_2'$ is a hydrogen atom or a tertiary butyl radical attached in the ortho position, $R_3$ is as specified above and the phenoxy groups are attached to the phenylene groups in the meta position.

Esters of Formula II and III and their methods of preparation are described in copending United States applications Ser. Nos. 434,094 and 382,964.

The organo-metallic compounds present in the compositions according to the invention are those compounds which oxidise or reduce the organic radicals formed during oxidative degradation of esters, that is, salts of aliphatic acids having more than eight carbon atoms or complexes in which the ligands are composed of any or all of the elements carbon, hydrogen, oxygen and nitrogen. Suitable metals are the transition metals, especially the first transition series (according to the Periodic Table based on that of Mendeleeff), and the nontransition metals such as cerium, which metals can take part in "electron transfer" reactions. It is preferred to use those metals in which the oxidation potential of a couple between a lower and a higher oxidation state is greater than or equal to +0.75 (using the British sign convention and couples in acid solution).

The organo-metallic compound must not be so volatile that it is distilled or evaporated out of the lubricating composition at high temperatures, for example, above 200° C. It must also be soluble in the base oil.

The preferred transition metals are manganese and cobalt, though chromium or ion could also be used. Copper has been found to be a suitable transition metal. Cerium is a suitable nontransition metal.

The preferred complexes are the acetylacetonates, especially the hydrated acetylacetonates, for example, manganous and cobaltous acetylacetonates. Cupric phthalocyanine has also been found to be suitable.

A suitable copper salt is cupric stearate.

Although the compounds described above have excellent high temperatures antioxidant properties when used by themselves, the compositions may also include other lubricant additives, for example, metal deactivators and load carrying additives, in amounts sufficient for the particular purpose, and conventional antioxidants that are primarily effective at low temperatures (for example, below 200° C), for example, aromatic amine antioxidants.

An unusual and surprising aspect of the present lubricating compositions is that the organo-metallic compounds are effective in extremely small amounts. This is an important advantage from the point of view of the cost of the compositions. The maximum quantity suitable is 500 p.p.m. and the preferred range is from 1 to 15 p.p.m. of metal, based on the total weight of the composition.

By way of example, high temperature oxidation tests were carried out on an aromatic ester base oil and on the same base oil inhibited with a number of organo-metallic compounds. The base oil consisted of di-o-tertiary-butylphenyl azelate which was prepared in the manner described in co-pending U.S. application Ser. No. 434,094, filed Feb. 19, 1965.

The oxidation test consisted in blowing air at a rate of 15 litres per hour through a 6 gram sample of the oil held at a high temperature for five hours. The oxidation stability was determined by measuring the viscosity and acidity increases in the oil, due to the test, and the amount of oxygen consumed. The results given in the following table illustrate the excellent high temperature oxidation stability of the compositions according to the invention. Comparison of the results shows that only concentrations of organo-metallic compound according to the invention are effective.

TABLE 1.—COPPER COMPOUNDS

| Organometallic compound | Temperature (° C.) | Metal content (p.p.m.) | Time [1] (hrs.) | Volume $O_2$ consumed (ml.) | $KV_{210}$ increase (percent) | Acidity increase (mg. KOH/g.) |
|---|---|---|---|---|---|---|
| Nil | 231 | Nil | 3.0 | 180 | 29 | 10.5 |
| Cupric Pthalocyanine | 231 | 5 | 3.2 | 148 | 20 | 7.3 |
| Do | 231 | 10 | 5.5 | 111 | 19 | 6.1 |
| Do | 231 | 25 | 2.4 | 162 | 31 | 7.1 |
| Cupric Stearate | 231 | 10 | 4.6 | 133 | 20 | 6.3 |
| Nil | 259 | Nil | 0.7 | 320 | 150 | 44.3 |
| Cupric Phthalocyanine | 259 | 10 | 1.0 | 288 | 182 | 17.2 |

TABLE 2.—COBALT COMPOUNDS

| Organometallic compound | Temperature (° C.) | Metal content (p.p.m.) | Time [1] (hrs.) | Volume $O_2$ consumed (ml.) | $KV_{210}$ increase (percent) | Acidity increase (mg. KOH/g.) |
|---|---|---|---|---|---|---|
| Nil | 231 | Nil | 2.2 | 185 | 40 | 9.0 |
| Cobaltous Acetylacetonate [2] | 231 | 10 | >5.0 | 87 | 22 | 5.9 |
| Nil | 259 | Nil | 0.7 | 320 | 150 | 44.3 |
| Cobaltous Acetylacetonate [2] | 259 | 10 | 1.5 | 210 | 132 | 14.6 |
| Do [2] | 259 | 1,300 | 2.6 | 157 | 206 | [3] 20.8 |

TABLE 3.—MANGANESE COMPOUNDS

| Organometallic compound | Temperature (° C.) | Metal content (p.p.m.) | Time [1] (hrs.) | Volume $O_2$ consumed (ml.) | $KV_{210}$ increase (percent) | Acidity increase (mg. KOH/g.) |
|---|---|---|---|---|---|---|
| Nil | 259 | Nil | 0.4 | 349 | 125 | 56.9 |
| Manganic Acetylacetonate | 259 | 10 | 0.7 | 368 | 206 | 18.4 |
| Manganous Acetylacetonate | 259 | 10 | 0.7 | 336 | 166 | 19.3 |
| Do [2] | 259 | 10 | 0.9 | 278 | 102 | 14.5 |

[1] Time required for 0.5 mole $O_2$ to be consumed by 500 g. sample.
[2] Dihydrate.
[3] Heavy lacquering, some sludge.

Different batches of the base-fluid were used in these experiments and this accounts for the slight differences in values tabulated for the uninhibited ester, in different experiments at the same temperature. However, direct comparisons between inhibited and uninhibited esters were made using base-fluid from a single preparation.

We claim:
1. A lubricating composition consisting essentially of a blend of:
  (a) a liquid aromatic ester base oil consisting of at least one diester having the general formula

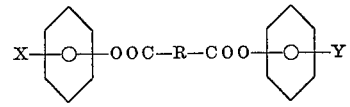

wherein R is a saturated hydrocarbon group having from 1 to 14 carbon atoms, X and Y are the same or different and each of said X and Y being selected from the group consisting of hydrogen, alkyl, aryl, alkyl-substituted aryl, diaryl, alkyl-substituted diaryl, aryloxy, alkyl-substituted aryloxy, diaryloxy, alkyl-substituted diaryloxy, and wherein the sum of the carbon atoms for X and Y does not exceed 14, and
  (b) at least one organo-metallic compound selected from the group consisting of
    (1) salts of carboxylic acids containing from 8 to 22 carbon atoms,
    (2) chelates of beta di-ketones having the formula

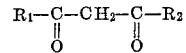

wherein $R_1$ and $R_2$ are selected from the group consisting of alkyl, cycloalkyl, and aromatic groups containing from 1 to 10 carbon atoms, and
    (3) metal phthalocyanines, wherein the metal component of said organo-metallic compound is selected from the group consisting of metals of the first transition series according to the Periodic Table of Mendeleeff and cerium, said organo-metallic compound being present in an amount which produces a metal content of up to 500 p.p.m., based on the total weight of the lubricating composition.

2. The lubricating composition of claim 1, wherein the said organo-metallic compound is present in an amount which gives a metal content of from about 1 to about 15 parts per million, based on the total weight of the composition.

3. A lubricating composition in accordance with claim 1, wherein the metal component of the said organo-metallic compound is cobalt.

4. A lubricating composition in accordance with claim 1, wherein the metal component of the said organo-metallic compound is manganese.

5. A lubricating composition in accordance with claim 1, wherein the metal component of the said organo-metallic compound is copper.

6. A lubricating composition in accordance with claim 1, wherein the metal component of the said organo-metallic compound is cerium.

References Cited

UNITED STATES PATENTS

| | | | |
|---|---|---|---|
| 2,231,248 | 2/1941 | Bowden | 252—57 |
| 2,305,627 | 12/1942 | Lincoln et al. | 252—49.7 XR |
| 2,465,296 | 3/1949 | Swiss | 252—49.7 XR |
| 2,529,300 | 11/1950 | Lieber | 252—52 |
| 2,795,549 | 6/1957 | Abbott et al. | 252—49.7 |
| 3,128,302 | 4/1964 | Martinek | 252—57 XR |
| 3,137,703 | 6/1964 | Burback | 252—49.7 XR |
| 2,539,504 | 1/1951 | Zisman et al. | 252—37 |
| 3,003,859 | 10/1961 | Irish et al. | 252—42.7 |
| 3,018,248 | 1/1962 | Foehr | 252—37 |
| 3,023,164 | 2/1962 | Lawton et al. | 252—49.7 |
| 3,053,768 | 9/1962 | Cupper | 252—56 |
| 3,093,585 | 6/1963 | Low et al. | 252—37 |

DANIEL E. WYMAN, *Primary Examiner.*

W. H. CANNON, *Assistant Examiner.*